(12) United States Patent
Boyd et al.

(10) Patent No.: US 7,275,780 B2
(45) Date of Patent: Oct. 2, 2007

(54) DUAL TARP COVER SYSTEM

(75) Inventors: David Boyd, Fishers, IN (US); Steven A. Henning, Jr., Anderson, IN (US)

(73) Assignee: Aero Industries, Inc., Indianapolis, IN (US)

( * ) Notice: Subject to any disclaimer, the term of this patent is extended or adjusted under 35 U.S.C. 154(b) by 30 days.

(21) Appl. No.: 11/282,434

(22) Filed: Nov. 18, 2005

(65) Prior Publication Data

US 2006/0119128 A1  Jun. 8, 2006

Related U.S. Application Data

(60) Provisional application No. 60/629,514, filed on Nov. 19, 2004.

(51) Int. Cl.
*B60P 7/02* (2006.01)

(52) U.S. Cl. ............... 296/100.14; 296/98; 296/100.01

(58) Field of Classification Search ................. 296/98, 296/100.01, 100.14
See application file for complete search history.

(56) References Cited

U.S. PATENT DOCUMENTS

| | | | |
|---|---|---|---|
| 4,842,323 A | 6/1989 | Trickett | |
| 5,031,955 A | 7/1991 | Searfoss | |
| 5,080,423 A | 1/1992 | Merlot et al. | |
| 5,125,713 A | 6/1992 | Willingham et al. | |
| 5,466,030 A | * | 11/1995 | Harris et al. ................. 296/98 |
| 5,658,037 A | 8/1997 | Evans et al. | |
| 5,957,523 A | 9/1999 | Haddad, Jr. | |
| 6,338,521 B1 | 1/2002 | Henning | |
| 6,575,518 B1 | 6/2003 | Henning | |
| 6,712,419 B1 | 3/2004 | Gothier | |
| 6,779,828 B1 | 8/2004 | Poyntz | |

OTHER PUBLICATIONS

"Easy Pull Tarping System", Aero Industries, Inc., Indianapolis, IN, 4 pages.
"Easy Cover Tarping System", © 2002, Aero Industries, Inc. Indianapolis, IN, 5 pages.

* cited by examiner

*Primary Examiner*—Lori L. Lyjak
(74) *Attorney, Agent, or Firm*—Maginot, Moore & Beck

(57) ABSTRACT

A cover system for an open-topped container includes two covers that are individually and separately deployable over the open top of the container body. The covers may be fabricated from different material and may be deployed using different deployment mechanism.

15 Claims, 3 Drawing Sheets

DUAL TARP COVER SYSTEM

CROSS-REFERENCE TO RELATED APPLICATION

This application claims priority to U.S. Provisional Application Ser. No. 60/629,514, entitled "Dual Tarp Cover Systems", which was filed on Nov. 19, 2004. The entire specification of this provisional application is incorporated herein by reference.

BACKGROUND OF THE INVENTION

The present invention relates to cover systems, particularly for hauling vehicles, such as dump trucks.

Many hauling vehicles, such as dump trucks, include open-topped containers useful for hauling or storing various materials. For example, in a typical dump truck application, the dump body is used to haul a variety of particular material, such as asphalt, gravel, aggregate or similar products. Other hauling vehicles carry organic materials, such as grain or produce.

Depending upon the nature of the materials stored in the open-topped container, it is often desirable to provide a cover for the container. Of course, rigid covers are well known that may be hinged from end of the container body. These rigid covers have gradually given way in the trucking industry to flexible tarping systems because the flexible tarpaulin can be easily stowed when a cover is not necessary, such as when the dump truck is being loaded. Moreover, the flexible tarp is much easier to deploy than a rigid cover, and is easier to replace when it becomes worn or damaged. Furthermore, in some instances the flexible tarp provides a tighter environmental seal for the contents of the container than is provided by a rigid cover.

A variety of tarping systems have been developed that are geared to particular hauling vehicle applications. One cover system particularly suited for open-topped containers on hauling vehicles is the EASY COVER® tarping system, marketed by Aero Industries, Inc. The EASY COVER® tarping system includes a U-shaped bail member that is pivotally mounted at its end to the base of the container body. The horizontal section of the U-shaped bail is attached to the tarp, while the free ends of the vertical elements are pivotably mounted to the truck body. In certain applications, the EASY COVER® tarping system includes an actuation mechanism that automatically pivots the U-shaped bail member to deploy the tarp over the load within the open-topped container. When the actuation mechanism is released, it automatically pivots the bar, thereby unfurling the tarp from the tarp roller at the front of the vehicle. A hand crank or powered motor can be provided to rotate the tarp roller to retract or wind the tarp when it is desired to open the container top.

The EASY COVER® tarping system is generally illustrated in FIG. 1. A vehicle 10 includes an open-top dump body 12 that is covered by a flexible cover system 15. The cover system includes a tarpaulin cover 16 that is shown in its deployed position spanning the length of the container and covering the load within. The tarp cover 16 is wound onto a retraction mechanism 19, which is in the form of a roller assembly, to stow the cover when not in use. The retraction mechanism 19 is typically supported on a cab protector 13 that overhangs the cab of the truck 10. A wind deflector 14 can be provided in a variety of configurations ranging from a simple deflector plate to a housing that substantially encases the retraction mechanism 19.

An extension mechanism 17 is utilized to pull the tarp 16 across the container body 12. The extension mechanism 17 includes the U-shaped bail member 22 that includes a horizontal bar 24 to which the free end of the cover or tarp 16 is attached. The extension mechanism 17 also includes a pivoting mechanism 25, such as a spring pack, that rotates the bail member 22 toward the back of the dump body 12.

In the EASY COVER® tarping system and similar powered systems, the extension mechanism 17 operates to deploy the cover 16, while a separate mechanism operates to retract the cover against the force of the extension mechanism. Thus, the retraction mechanism 19 includes a drive motor 20 that rotates the roller of the retraction mechanism to wind the cover onto the roller. The drive motor 20 is reversed or disconnected from the retraction mechanism roller to allow the pivoting mechanism 25 to pivot the bail arms to their deployed position.

A manually deployed tarping system for use with dump trucks is the Easy Pull® tarping system, also produced by Aero Industries, Inc. As depicted in FIG. 2, The Easy Pull® system 30 includes a flexible tarp 31 that is wound around a spool 34 at one end of a dump bed. The spool 34 includes its own retraction mechanism, such as a torsion spring arrangement (not shown) that drives the spool to retract the cover. A wind deflector 14 can be provided to protect the spool and wound tarp.

With this type of system, the cover is manually unwound against the retraction mechanism of the spool 34. In particular, a rope 40 attached a pull bar 38 at the free end of the tarp is used to unwind the tarp from the roller to extend along the length of the dump bed. Anchors 42, 43 are provided at the front and back ends of the dump bed 12 around which the pull rope 40 is wound for storage. In use, the pull rope is removed from the front anchor 43 and carried to the end of the dump body 12. As the rope 40 is manually pulled, the cover is extended across the load. Once the cover is in its deployed position, as shown in FIG. 2, the pull rope 40 can be tied off on the rear anchor 42.

The cover or tarp 31 is configured to include flaps 32 that overhang the sides of the dump body 12. The flaps 32 are typically pulled tight by tension cords 36 that are weaved through openings in the flaps and wrapped around anchors on the sides of the dump bed. The flaps are important (and even mandated by some state regulations) when hauling certain materials, such as asphalt.

The nature of the hauled material can dictate the type of cover 16 or 31 that is used to cover the load within the dump body 12. In the case of asphalt, the tarp is formed of a heavy duty vinyl material. For other applications, such as hauling gravel, the cover is formed of a mesh material.

The different tarp or cover requirements for different loads can be problematic, requiring either the use of a different truck outfitted with the necessary cover system, or the replacement of the cover system on a particular truck with the necessary tarp. Neither option is very desirable. What is needed is a system for covering an open-topped vehicle container that allows for ready substitution of the tarp or cover spanning the load.

DESCRIPTION OF THE PREFERRED EMBODIMENTS

Figure 1:
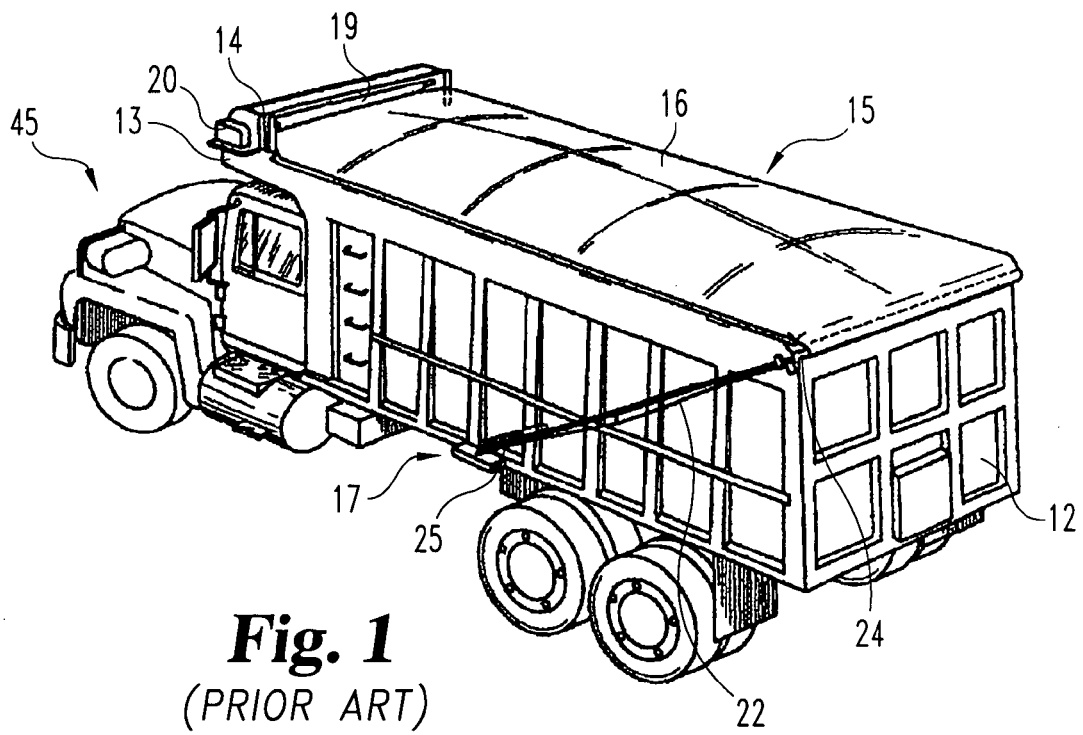
FIG. 1 is a perspective view of a dump truck with powered cover system of the prior art mounted thereon.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In accordance with one embodiment of the invention, two cover systems are integrated into a single vehicle cover system 45 supported on trailer or hauling body and/or the cab protector 13 of the truck 10. In one particular embodiment, a powered cover system 15 is mounted on the cab protector, although it is understood that the system 15 could be mounted on or within the trailer, hauling body or dump body 12. The cover system 15 preferably includes the same components illustrated in FIG. 1, namely the cover 16, retraction mechanism 19 driven by a motor 20, bail arms 22 for automatically deploying the tarp and a horizontal bar 24 connecting the cover to the bail arms. The cover system 15 operates as described above in which the bail arms 22 automatically pivot, carrying the cover toward the rear of the dump body and the deployed position shown in FIG. 1. Of course, other powered cover systems are contemplated that may be modified from that shown in the figures.

Figure 2:
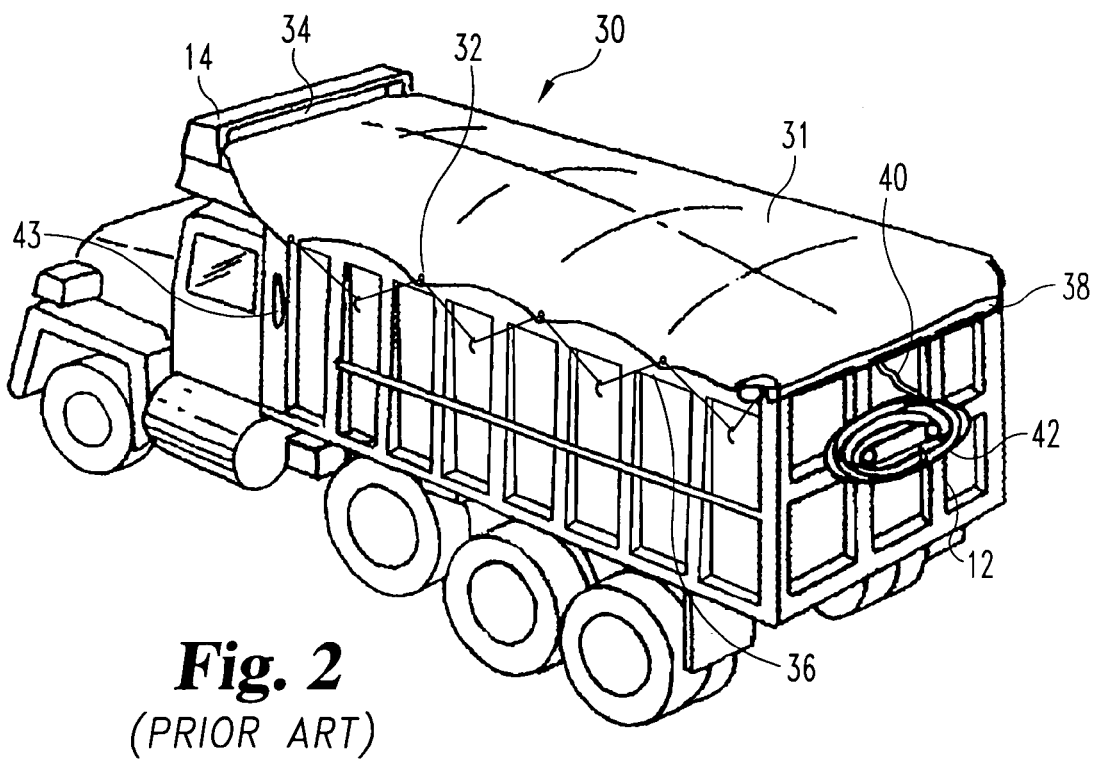
FIG. 2 is a perspective view of a dump truck with a manually deployed cover system of the prior art mounted thereon.

The cover system 45 further includes a manually operated cover system 30 that may be configured like the system shown in FIG. 2. In the particular embodiment, the cover system 30 includes a cover 31 that is wound on a spool 34 that is supported on the cab protector 13. Of course, the manual cover system 30 may be mounted on or within the trailer, hauling body or dump body 12. A pull bar 38 is attached to the free end of the cover 31, with the pull rope (FIG. 4) connected to the pull bar. The pull rope 40 can be wound on a front anchor 43 (FIG. 2) when the cover or tarp 31 is in its retracted or stowed position. The cover system 30 operates in the manner described above to deploy the cover 31 over the dump body 12.

The automatic cover system 15 operates as described when it is desired to extend the cover 16 across the load. This cover can be the mesh cover used when hauling gravel and the like. It is preferable that the lighter weight cover material be used with the automatic cover system to reduce the torque that must be produced by the pivoting mechanism to deploy the cover.

Figure 5:
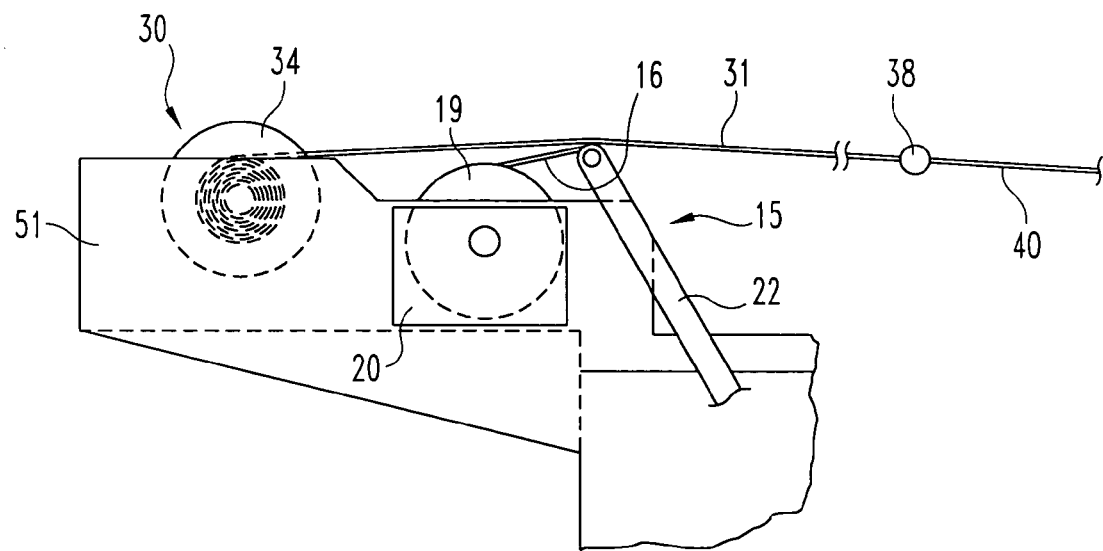
FIG. 5 is an enlarged side view of a dual tarp cover system in accordance with another embodiment of the invention.

On the other hand, the manually deployed cover 31 can be fabricated in a heavier duty tarp material, such as the vinyl used to cover an asphalt load. In addition, the cover can include the flaps 32 discussed above. The cover 31 is extended by manually operating the cover system 30 in the manner described above. While the cover is being pulled over the dump body, it is also passing over the first cover system 15. In order to facilitate the passage of the cover 31 over the first cover system 15, the second cover system 30 can be vertically offset from the first system. Thus, as shown in FIG. 5, a modified cab protector 51 can support the roller 34 vertically offset from the retraction mechanism 19. Thus, when the pull bar 38 is pulled by the rope 40, the cover or tarp 31 travels more smoothly over the end of the bail arms 22 and over the first cover 16. Of course, the roller 34 can be offset even further vertically so that the cover 31 never touches the first cover system 15 as the cover is being deployed.

Figure 4:
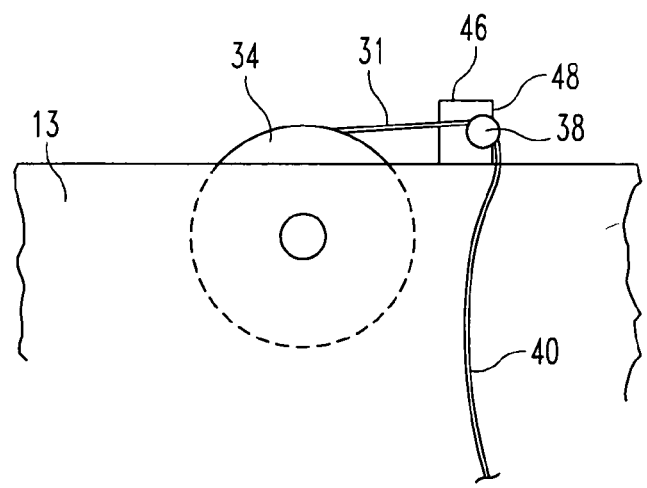
FIG. 4 is a side partial detail view of the cover system shown in FIG. 3.

The cab protector 13 or hauling body can be modified to provide a support for the pull bar 38 when the cover 31 is in its stowed position. As shown in FIG. 4, a bracket component 46 can be mounted to the cab protector, with the bracket component defining a notch 48 for receiving the ends of the pull bar 38 with the pull rope 40 freely accessible at the side of the dump body.

Figure 3:
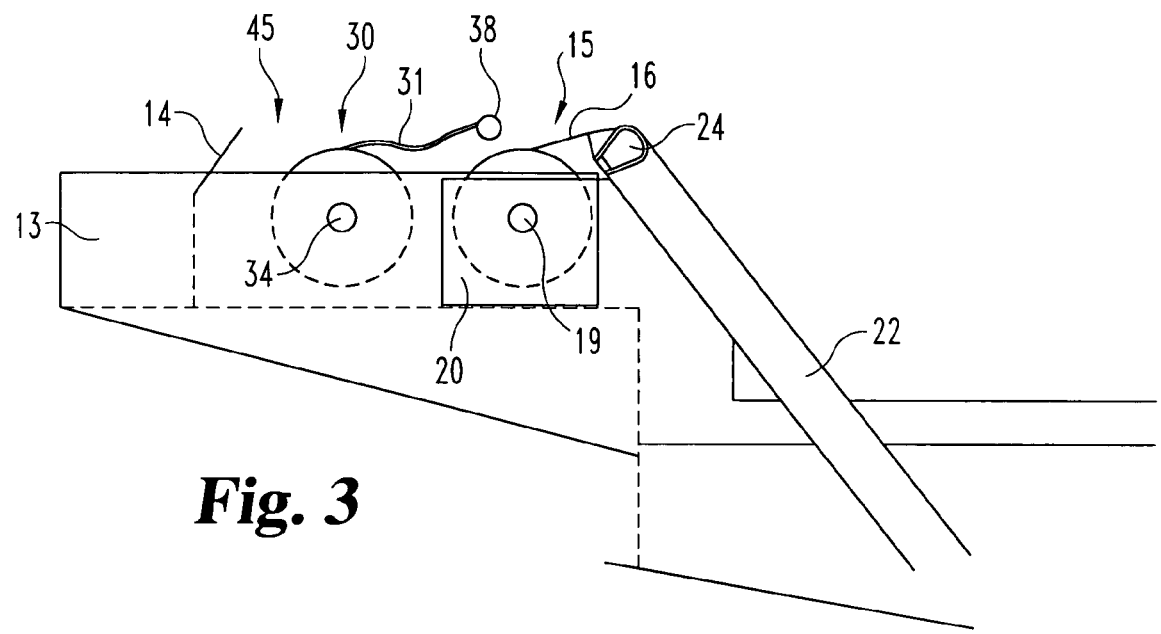
FIG. 3 is an enlarged side view of a dual tarp cover system in accordance with one embodiment of the invention.

It can be appreciated that the cover system 45 shown in FIGS. 3 and 5 provide the vehicle operator with two options for a cover or tarp. Since the second cover system 30 is manually operated, it does not occupy a significant amount of space on the cab protector 13 or hauling body. Moreover, the manual system does not require a second set of bail arms or a second pivoting mechanism.

Figure 6:
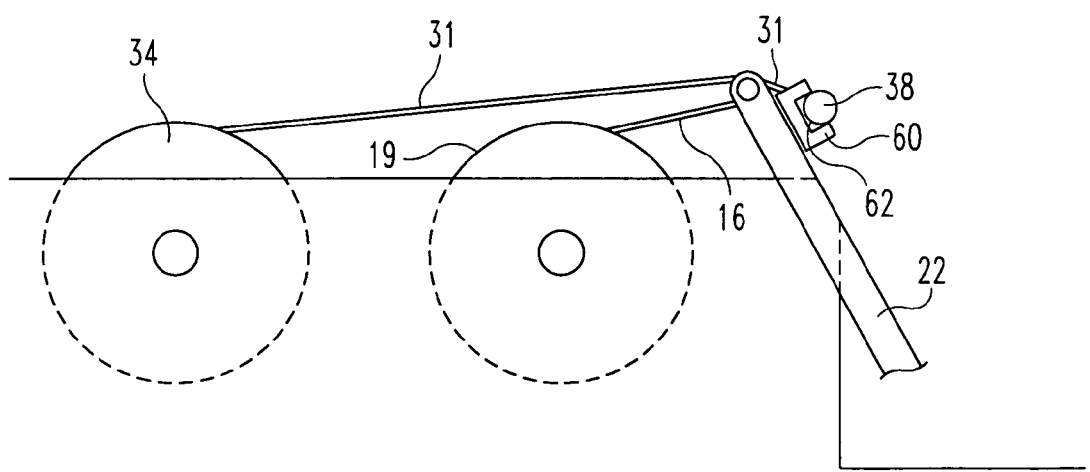
FIG. 6 is an enlarged side view of a dual tarp cover system in accordance with a further embodiment of the invention.

In another embodiment of the invention, the bail arms 22 of the first cover system 15 are modified to assist in the deployment of the second cover 31. As depicted in FIG. 6, the free ends of the bail arms 22 include a bracket 60 that defines a notch 60. Each notch 62 is configured to receive an end of the pull bar 38. Thus, when the bail arms 22 are pivoted by the pivoting mechanism 25 (FIG. 2), both covers 16 and 31 are deployed across the dump body. The second cover 31 can include the flaps 32 described above. In this case, the first cover 16 may be redundant or may be regarded as an additional barrier to contain the load within the dump body.

The present invention contemplates an improvement to cover systems used to cover an open-topped container or body, particularly a dump body on a truck. The invention comprises two cover systems mounted to a common vehicle, trailer, hauling body or container, in which one of the cover systems is automatically deployed and the other is manually deployed. Thus, in one embodiment, the automatically deployed system includes pivoting bail arms attached to the free end of a first cover or tarp. A pivoting mechanism is connected to the bail arms to cause them to pivot and extend the first cover to its deployed positions.

Alternatively with this invention, the first cover system can remain stowed and the second cover system be manually deployed. The second cover system includes a pull bar connected to the free end of a second cover or tarp. A rope connected to the pull bar is manually pulled to extend the second cover.

The present invention further contemplates a cover system that provides two different types of covers on a common vehicle or container. One cover can be heavier and heavier duty than the other for use with more problematic loads.

In a further embodiment of the invention, the bail arms of the automatic cover system can be modified to assist in the deployment of the second cover system. In this embodiment, the ends of the bail arms are fitted with a bracket configured to support the pull bar of the second cover system. With this embodiment, both covers are deployed simultaneously as the bail arms are pivoted.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, while the second cover system 30 has been described as being manually deployed, it may be connected to a pivoting bail arm apparatus similar to the apparatus in system 15. In this instance, the bail arms for the second cover system 30 would be outboard of the bail arms 22 for the first cover system 15 to avoid a conflict between the two systems when one or the other is deployed.

In yet another modification, one or the other of the two cover systems 15, 30 may be configured to span only a portion of the length of the container body 12. With this modification, it is preferable that the first cover system 15 be configured for the shorter extension, since it is upstream and inside of the second cover 31 when it is deployed.

It is also contemplated that a hold-down apparatus can be employed with either or both cover systems 15, 30. The hold-down apparatus can take on a variety of forms, such as the hold-down mechanisms disclosed in U.S. Pat. No. 6,338,521 to Henning, U.S. Pat. No. 6,575,518 to Henning, and U.S. Pat. No. 6,712,419 to Gothier, the disclosures of which are incorporated herein by reference.

In the illustrated embodiments, the cover systems a arranged to be deployed along the length of the container or truck body. As a further alternative, the concepts of the present invention can be utilized on side-deployed or side dump systems in which the tarp extends laterally across the width of the container body.

In yet another alternative, the two cover systems can be mounted on opposite ends or sides of the container. In this alternative embodiment, the two covers are deployed in opposite directions across the open-top of the container body.

In the embodiments shown in FIGS. 3-5 each cover system is separately mounted to the vehicle or container. However, it can also be appreciated that the two cover systems may be incorporated into a single system mountable to the vehicle or container. In this approach, the two rollers 19, 34 are mounted on a single support frame and this frame is then mounted to the vehicle or container.

In the illustrated embodiments, one of the cover systems 15 is non-manually powered, while the other system 30 is manually powered. It is contemplated that any combination of the two systems may be manually or non-manually powered. For instance, both cover systems 15, 30 may be manually powered, with appropriate modification to the cover system 15, or the cover system 15 may be manually powered while the other system 30 is mechanically/electrically powered. It is further contemplated that more than two cover systems may be provided to cover a common container or hauling body.

What is claimed is:

1. A cover system for an open-topped container comprising:
   a first cover system having a first cover sized for deployment across at least a portion of the open-topped container; and
   a second cover system having a second cover sized for deployment across at least a portion of the open-topped container,
   wherein said first and second cover systems are supported relative to the open-topped container so that each of said first and second covers can be deployed across the container.

2. The cover system of claim 1, wherein at least one of said first cover system and said second cover system includes a non-manually powered deployment mechanism.

3. The cover system of claim 2, wherein said non-manually powered deployment system includes a spring-actuated bail arm connected to a free end of said corresponding first cover or second cover.

4. The cover system of claim 2, wherein said non-manually powered deployment system includes a motor driven bail arm connected to a free end of said corresponding first cover or second cover.

5. The cover system of claim 2, wherein the other of said first cover system and said second cover system includes a manually powered deployment mechanism.

6. The cover system of claim 5, wherein said manually powered deployment mechanism includes a pull rope attached to a free end of said corresponding first cover or second cover.

7. The cover system of claim 1, wherein at least one of said first cover system and said second cover system includes a manually powered deployment mechanism.

8. The cover system of claim 6, wherein said manually powered deployment mechanism includes a pull rope attached to a free end of said corresponding first cover or second cover.

9. The cover system of claim 1 in which the open-topped container is carried by a vehicle having a cab protector, wherein at least one of said first and second cover systems is supported on the cab protector.

10. The cover system of claim 9, wherein said second cover system is supported on the cab protector vertically offset from said first cover system.

11. The cover system of claim 1, wherein said first cover and said second cover are fabricated from different materials.

12. The cover system of claim 11, wherein one of said first and second covers is fabricated from a canvas material and the other of said covers is fabricated from a mesh material.

13. The cover system of claim 1, wherein:
   said second cover system includes a rod attached to a free end of said second cover;
   said first cover system includes a bail arm connected to a free end of said first cover, said bail arm pivotably supported relative to the open-topped container to deploy said first cover across the container as said bail arm pivots; and
   a bracket attached to said bail arm and configured to engage said rod, whereby said second cover is deployed across the container as said bail arm pivots when said rod is engaged to said bracket.

14. A method for covering an open-topped container comprising:
   providing at least a first cover system having a first cover deployable over the container and a second cover system having a second cover deployable over the container; and
   selectively deploying one of both of the covers across the container.

15. The method for covering an open-topped container of claim 14, wherein:
   the first and second covers are fabricated from different materials; and
   the covers are selectively deployed depending upon the contents of the container.

* * * * *